United States Patent
Elser et al.

(10) Patent No.: US 7,004,877 B2
(45) Date of Patent: Feb. 28, 2006

(54) VARIABLE SPEED TRANSMISSION ARRANGEMENT WITH AN INFINITELY VARIABLE TOROIDAL DRIVE AND A SUMMING GEAR SET OF THE PLANET WHEEL TYPE

(75) Inventors: Wolfgang Elser, Remshalden (DE); Steffen Henzler, Böbingen/Rems (DE); Dinh Cuong Nguyen, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 39 days.

(21) Appl. No.: 10/751,338

(22) Filed: Jan. 2, 2004

(65) Prior Publication Data

US 2004/0157694 A1  Aug. 12, 2004

Related U.S. Application Data

(63) Continuation-in-part of application No. PCT/EP02/05777, filed on May 25, 2002.

(30) Foreign Application Priority Data

Jul. 5, 2001 (DE) ................................ 101 32 674

(51) Int. Cl.
*F16H 37/02* (2006.01)
(52) U.S. Cl. ...................................... 475/216; 475/217
(58) Field of Classification Search ................ 475/209, 475/214, 216, 217; 476/40, 42
See application file for complete search history.

(56) References Cited

U.S. PATENT DOCUMENTS

| 5,607,372 A | * | 3/1997 | Lohr ........................... 475/216 |
| 6,059,685 A | | 5/2000 | Hoge et al. |
| 6,213,907 B1 | * | 4/2001 | Wooden ...................... 475/216 |
| 6,358,178 B1 | * | 3/2002 | Wittkopp .................... 475/207 |

FOREIGN PATENT DOCUMENTS

| DE | 197 54 146 | | 2/2001 | |
| DE | 100 46 926 | | 6/2001 | |
| JP | 5-39834 | * | 2/1993 | ................. 475/216 |
| JP | 20 00220719 | | 8/2000 | |
| WO | WO 98/39582 | | 9/1998 | |

* cited by examiner

*Primary Examiner*—Ha Ho
(74) *Attorney, Agent, or Firm*—Klaus J. Bach

(57) ABSTRACT

In a variable speed transmission arrangement including an infinitely variable drive having two toroidal input and toroidal output traction wheels with a central shaft connected for rotation with an input traction wheel and extending through the output and the other toroidal input traction wheel and being connected to a planet carrier of a planetary summing gear set while the toroidal traction output wheel is connected, by way of a hollow shaft receiving the central shaft, to the sun wheel of the planetary summing gear set, and the other toroidal traction input wheel is directly connected to the planet carrier by way of a rotational interlocking means rotationally interlocking the planet carrier and the other toroidal traction input wheel, but permitting relative axial movement to facilitate assembly.

13 Claims, 2 Drawing Sheets

VARIABLE SPEED TRANSMISSION ARRANGEMENT WITH AN INFINITELY VARIABLE TOROIDAL DRIVE AND A SUMMING GEAR SET OF THE PLANET WHEEL TYPE

This is a CIP of PCT/EP02/05777 filed on May 25, 2002.

BACKGROUND OF THE INVENTION

The present inventions relate to a variable speed transmission arrangement with an infinitely variable toroidal drive and a planetary summing gear arrangement including a central shaft extending through the toroidal drive for direct power transmission through the transmission arrangement.

U.S. Pat. No. 6,059,685 discloses a variable speed transmission arrangement, in which the toroidal drive includes a the two-chamber arrangement, whereby the central shaft drivable from a drive motor or engine is connected to a first central wheel and, at its end, to a second drive-side central wheel of the toroidal drive. The second central wheel is arranged coaxially to the central shaft and, with respect to its toroidal friction surface, mirror-symmetrically to the first drive-side central wheel, and is connected directly to the planet carrier of the toroidal drive. The first and second drive-side central wheels of the toroidal drive are in engagement in a known way by means of their friction surfaces, via intermediate wheels arranged pivotably for a change of the transmission ratio, with the toroidal friction surfaces of an output central wheel of the toroidal drive. The output central wheel is arranged coaxially to and in the center region of the central shaft and the central shaft passes with play through the second central wheel. The output central wheel is connected fixedly in terms of rotation, by means of an intermediate shaft which is concentric to the central shaft directly to the sun wheel of a summing gear set. The sun wheel meshes with main planet wheels mounted on the planet carrier via bearing bolts. Secondary planet wheels mounted on the planet carrier mesh both with the main planet wheels and with a ring wheel. The ring wheel is connected by means of an associated clutch to a gear member of a follow-up gear set of the planet wheel type, the sun wheel of which is stationary with respect to the transmission case. In this instance, the assignment between the summing gear set and the follow-up gear set is such that, on the one hand, the ring wheel of the summing gear set can be coupled to the planet carrier of the follow-up gear set. Then the planet carrier supports the double planet wheels and is connected for rotation with an output shaft, arranged coaxially to the central shaft, of the variable speed transmission arrangement. On the other hand, the sun wheel of the summing gear set can be connected for rotation with the sun wheel of the follow-up gear set via an associated clutch.

This known variable speed transmission arrangement is disclosed in the publication only in the form of a basic transmission diagram, without structural and functional solution details.

DE 100 46 926 A1 discloses a further generic variable speed transmission arrangement, in which a central shaft passes with play through a central wheel of an infinitely variable toroidal drive. The central wheel has a toroidal friction surface on one end face, and is connected fixedly in terms of rotation, at its shaft end lying adjacently to the other end face of the central wheel, to a planet carrier of a summing gear set of the planet wheel type. A direct mutual rotationally fixed drive connection is likewise provided for the central wheel and the planet carrier, and is designed in such a way that the central wheel has coupling members projecting axially from its other end face. The planet carrier has corresponding counter-coupling members projecting axially from this adjacent end face. The axial overall length of this known variable speed transmission arrangement is increased due to these coupling members which are in rotationally fixed engagement with one another. The central shaft of this arrangement passes with play, at its other shaft end, through a second central wheel of the two-chamber toroidal drive, the second central wheel being arranged, with respect to its toroidal friction surface, mirror-symmetrically to the first central wheel, and connected directly to the planet carrier, of the toroidal drive. The second central wheel of the toroidal drive is in this case arranged coaxially, displaceably and fixedly in terms of rotation with respect to the central shaft. For the rotationally fixed arrangement intermediate coupling members in the form of rolling balls engage simultaneously outer axial coupling grooves on the inner circumference of the central wheel and radially aligned inner axial coupling grooves on the outer circumference of the central shaft. Owing to their short distance from the axis of rotation of the central shaft, the intermediate coupling members are stressed to the maximum by the torque of the second central wheel and are thereby restricted particularly in terms of their useful life. The central shaft of this known arrangement is connected releasably in a complicated way to the planet carrier of the summing gear set, for which purpose the central shaft has, on the outer circumference of its respective shaft end, an axial take-up toothing, engaged by a corresponding axial take-up toothing on the inner circumference of a hub which is arranged concentrically to the shaft end and which is connected for rotation with the planet carrier. In order to absorb the axial forces exerted on the planet carrier via the adjacent input-side central wheel of the toroidal drive, the hub of the planet carrier is supported against the securing ring inserted into a circumferential groove of the shaft end of the central shaft. The cross-section of the central shaft is appreciably weakened by the axial take-up toothing and the circumferential groove. Furthermore, because of the high torques to be transmitted on a small radius to the axis of rotation of the central shaft, these axial take-up toothings must be long in the directions of the axis of rotation. If the take-up toothings are arranged so as to be axially offset to the wheel set of the summing gear set, the overall length of the variable speed transmission arrangement would be appreciably increased. In order to avoid this, the hub of the planet carrier in this known arrangement is arranged concentrically within the wheel set of the summing gear set and, together with the wheel set, in the same axial region of the axis of rotation of the central shaft, although, as a result of this, the diameter ratios of the wheel set are necessarily affected and, consequently, the selection of the transmission ratios of the variable speed transmission arrangement is highly restricted.

It is the object of the present invention to provide a variable speed transmission arrangement of short axial overall length, which is easy to assemble, includes a one-part transmission case, a small number of components, low weight and a low manufacturing costs.

SUMMARY OF THE INVENTION

In a variable speed transmission arrangement including an infinitely variable drive having two toroidal input and toroidal output traction wheels with a central shaft connected for rotation with an input traction wheel and extending through the output and the other toroidal input traction wheel and being connected to a planet carrier of a planetary summing gear set while the toroidal traction output wheel is connected, by way of a hollow shaft receiving the central shaft, to the sun wheel of the planetary summing gear set, and the other toroidal traction input wheel is directly connected to the planet carrier by way of a rotational interlocking means rotationally interlocking the planet carrier and the other toroidal traction input wheel, but permitting relative axial movement to facilitate assembly.

The arrangement eliminates the need for a radial housing wall between the toroidal drive and the summing gear set, and the need for a special hollow shaft as a drive connection between the first drive-side central wheel of the toroidal drive and the planet carrier of the summing gear set. It therefore also provides for a radial reduction in the toroidal friction surface. The drive-side wheel of the toroidal drive is connected directly to the planet carrier of the summing gear set, without needing additional axial construction space for this purpose or without the toroidal friction surface being reduced in the radial direction. Also assembly and disassembly of the drive is greatly facilitated.

Preferably, this direct connection is implemented by means of axial engagement structures in the region of the outer circumference of the first drive-side wheel of the toroidal drive or in other areas of the first drive-side wheel and the planet carrier.

The second drive-side wheel of the toroidal drive is mounted for rotation with, and axially displaceably, by means of axial take-up toothings provided in the region of its outer circumference, into an annular cylinder. The annular cylinder is part of a pressure device for the engagement of the traction surfaces of the toroidal drive which are in contact with one another and is arranged coaxially with respect to the central shaft.

For cost reduction, the planet carrier of the summing gear set may be welded to the shaft end of the central shaft, which requires only a small amount of construction space and, in particular, does not affect the radial dimensions of the wheels of the summing gear set. Freedom in the design of the transmission ratios of the variable speed transmission arrangement is also preserved.

In a particular embodiment of the invention, the axial pressure forces exerted on the friction surfaces are introduced in one axial direction via the planet carrier of the summing gear set, without a radial intermediate housing wall, into the adjacent first drive-side traction wheel of the toroidal drive via axial bearing surfaces, the resultant axial force of which has the smallest possible radius to the geometric central transmission axis, so that the load and deformation of the planet carrier are kept low.

The second drive-side traction wheel may be connected for rotation with, and axially displaceably on its outer circumference, via axial take-up toothings, to the annular cylinder of the pressure device, and, in particular, its wheel cross section having the toroidal traction surface is supported centripetally and guided axially by means of an antifriction bearing, which is disposed between the tractionl wheel and central shaft and which allows relative movements in the direction of rotation and in the axial direction.

The two drive-side traction wheels of the toroidal drive may be designed identically, and, if appropriate, the arrangement described in the previous paragraph may also be provided.

In a particular embodiment of the variable speed transmission arrangement according to the invention, an output-side traction wheel or two output-side traction wheels of the toroidal drive is or are arranged in an axial center region of the central shaft and concentrically to the latter and are connected for rotation, by means of a concentric intermediate shaft, to a sun wheel of the summing gear set. The input traction wheel is connected directly to the planet carrier with the intermediate shaft extending therethrough. A radial connecting web is provided for connecting the planet carrier to the respective shaft end of the central shaft. Particularly with regard to the generation of noise, planet gear sets in automatic transmissions for passenger cars are designed with helical toothings which generate an axial force. Concerning the variable speed transmission arrangement according to the invention, the sun wheel of the summing gear set therefore-exerts a force on this intermediate shaft in the axial direction. In order to transfer these meshing forces to the transmission case, a radial housing intermediate wall could be provided.

In a preferred embodiment of the invention, however, this last-mentioned measure, which is considered to be complicated and unfavorable, is not employed, but, instead, the sun wheel of the summing gear set, on one hand, and the output-side traction wheel or wheels of the toroidal drive, on the other hand, are arranged axially displaceably in relation to one another. Particularly for ease of assembly, it is advantageous to arrange the intermediate shaft so as to be axially displaceable in relation to one of the traction wheel and the sun wheel.

In order to integrate the functions of rotationally fixed coupling and axial displacement for the sun wheel and intermediate shaft into a single coupling point and not to implement them by way of separate structures rolling balls are provided as coupling and axial bearing means.

In a particular embodiment of the variable speed transmission arrangement according to the inventions, the shaft end is connected to the planet carrier of the summing gear set so that a special radial intermediate wall can be eliminated.

In an embodiment of the invention, for the direct connection of the first drive-side traction wheel of the toroidal drive to the planet carrier of the summing gear set, the traction wheel has an axial hub extension of reduced diameter which axially overlaps the planet carrier. Axial take-up toothings are provided in the region of the outer circumference of the hub extension making the rotationally fixed connection.

In a particular embodiment of the invention, for the direct connection of the first drive-side central wheel of the toroidal drive to the planet carrier of the summing gear set, a special design of an insertable coupling is provided, in which at least one bearing bolt of a planet wheel is extended at its respective bolt end to form an end-face coupling pin, and the adjacent traction wheel has an axial recess corresponding to the form of the coupling pin. The permanent axial prestress (pressure forces) of the toroidal drive ensure the engagement of this coupling structure.

The invention will be described below in greater detail with reference to the drawings.

DESCRIPTION OF VARIOUS FEATURES OF THE INVENTION

Figure 1:
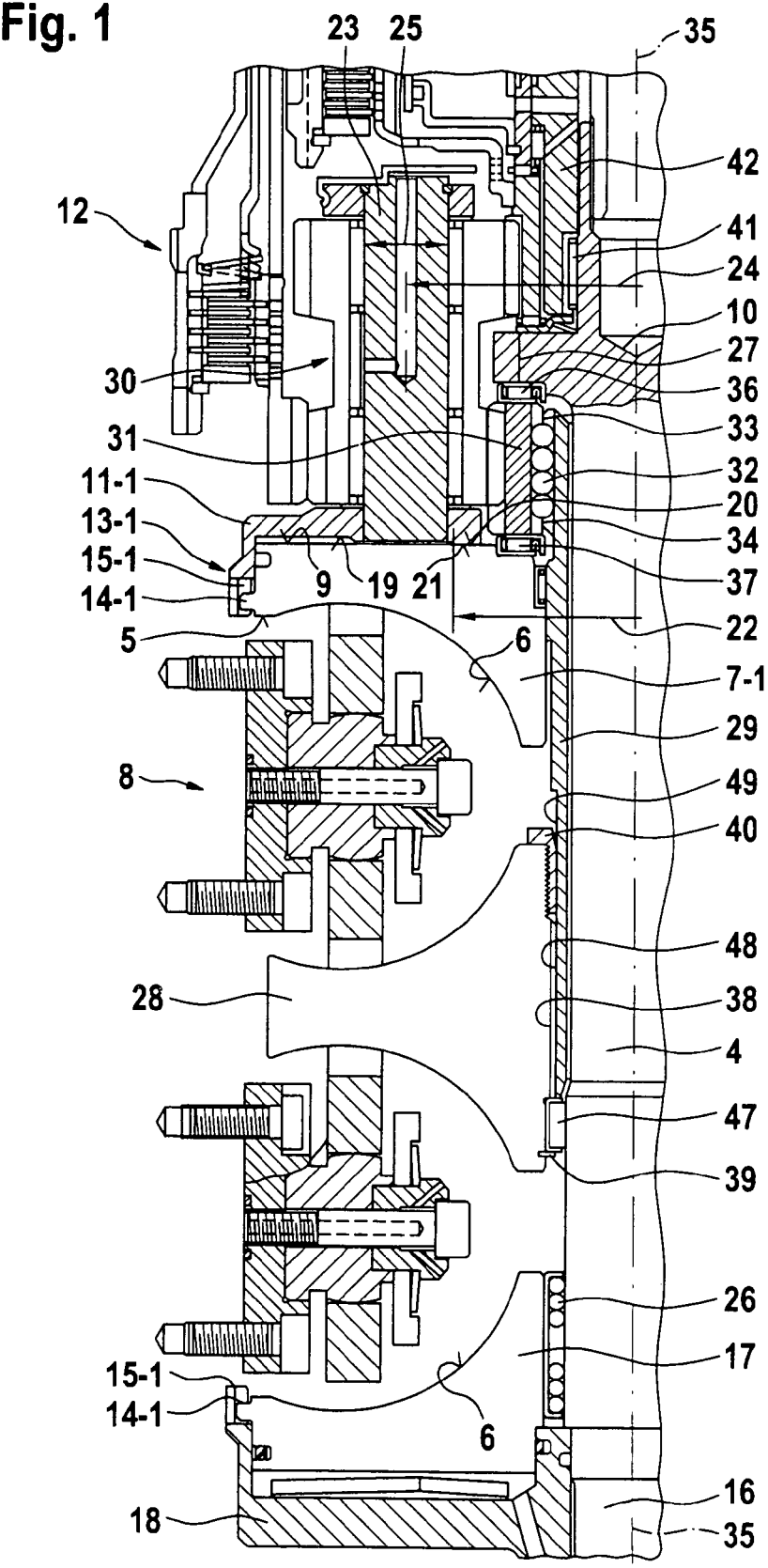
FIG. 1 is a partial axial sectional view of the variable speed transmission, showing the various features of the invention.

Referring to FIG. 1, an infinitely variable toroidal drive 8 and a summing gear set 12 of the planet wheel type are arranged with their central axes coaxially to a central transmission axis 35—35 in a transmission housing, which is not shown. A central drive shaft 4 which is coaxial to the transmission axis 35—35 passes with clearance through a first drive-side traction wheel 7-1 of the toroidal drive 8, The traction wheel has a toroidal traction surface 6 on one end face 5 as it is common. The shaft end 10, adjacent to the other end face 9 of the traction wheel 7-1, of the central shaft 4 is firmly connected to a planet carrier 11-1 of the summing gear set 12 by means of an electron beam weld 27. The traction wheel 7-1 and the planet carrier 11-1 are joined rotationally by a connection 13-1, in which the outer circumference of the traction wheel 7-1 has an inner axial engagement toothing 14-1 which rotationally engages in an axially moveable manner a corresponding outer axial engagement toothing 15-1 of the planet carrier 11-1.

At its other shaft end 16, the central shaft 4 extends through a second drive-side traction wheel 17 of the toroidal drive 8. This central wheel 17 is arranged, with respect to its toroidal traction surface 6, mirror symmetrically to the first drive-side traction wheel 7-1 and concentrically to the central shaft 4. The second drive-side traction wheel 17 of the toroidal drive 8 is received axially displaceably, in an annular cylinder 18 which, as part of a pressure device, is mounted concentrically onto the central shaft 4 for rotation therewith. Between the second traction wheel 17 and the annular cylinder 18, there is a rotationally fixed drive connection, which includes an inner axial engagement toothing 14-1 provided on the outer circumference of the traction wheel 17 interfacing in an axially movable manner with a corresponding outer axial toothing 15-1 of the annular cylinder 18.

The engagement toothings 14-1 of the two traction wheels 7-1 and 17 are of the same design, so that these traction wheels may, overall, be designed identically.

Between the central shaft 4 and the second traction wheel 17 a linear antifriction bearing 26 is inserted which allows relative linear and rotational movements.

In an axial center region of the central shaft 4, an output-side traction wheel 28 of the toroidal drive 8 is arranged concentrically to the transmission axis 35—35 and surrounds the central shaft 4, which passes through it with clearance and is connected for rotation with an intermediate shaft 29. The intermediate shaft 29 is concentric to the central shaft 4 and itself extends through the first drive-side traction wheel 7-1 of the toroidal drive 8 and is connected for rotation with, but axially displaceably relative to, a sun wheel 31 of the summing gear set 12. In this case, intermediate coupling members in the form of bearing balls 32 are received diametrically and simultaneously in two axial coupling grooves 33 and 34, of which the radially inner is formed on the outer circumference of the intermediate shaft 29 and the radially outer is formed on the inner circumference of the sun wheel 31. Some of such coupling structures 32–34 may be arranged distributed circumferentially uniformly in the circumference direction.

The sun wheel 31, using helical toothings, meshes with the smaller toothed gear of the main planet wheels 30 which are mounted on an associated bearing bolt 23 of the planet carrier 11-1. The sun wheel 31 is supported in one axial direction on the planet carrier 11-1 by an axial bearing 36 and in the other direction on the first drive-side central wheel 7-1 of the toroidal drive 8 by an axial bearing 37.

The planet carrier 11-1 is supported, with respect to a bearing bush 42 arranged so as to be fixed to the housing, by a radial bearing 41 via the associated shaft end 10 of the central shaft 4.

To introduce the pressure forces, the first drive-side central wheel 7-1 of the toroidal drive 8 and the planet carrier 11-1 are provided on their adjacent end faces 9 and 19 each with an axial bearing surface 20 and 21, whose effective radius to the transmission axis 35—35 is kept small. For this purpose, the outside diameter 22 of the axial bearing surfaces 20, 21 is limited to a reference value which is at most equal to the value of the pitch diameter 24, reduced by the diameter 25 of the bearing bolts 23, for the arrangement of the planet wheels 30 on the planet carrier 11-1, which is concentric with respect to the transmission axis 35—35.

The output-side central wheel 28 of the toroidal drive 8 has two toroidal friction surfaces 6, which are formed symmetrically at opposite sides of its axially perpendicular wheel center plane and complementarily to the friction surfaces 6 of the two drive-side traction wheels 7-1 and 17 of the toroidal drive 8. To engage them for concurrent rotation, the output-side central wheel 28 and the intermediate shaft 29 have corresponding axial toothings 38 and 48.

The output-side traction wheel 28 of the toroidal drive 8 is supported with respect to the central shaft 4 by a radial bearing 47 which is fixed by means of a securing ring 39 in one direction of the transmission axis 35—35 with respect to the output traction wheel 28 and in the opposite direction with respect to the end face of the intermediate shaft 29. In this way, the traction wheel 28 is secured non-displaceably with respect to the intermediate shaft 29 in the direction of the transmission axis 35—35 towards the planet carrier 11-1.

The intermediate shaft 29 has a circumferential groove 49 which is adjacent to its take-up toothing 38 and into which a slotted threaded sleeve 40 is inserted so as to be rotationally and axially moveable. The threaded sleeve 40 which is screwed with its external thread into a corresponding internal thread of the traction wheel 28 is supported, in the other direction of the transmission axis 35—35 toward the annular cylinder 18, on the groove side wall, delimiting the engagement toothing 38, of the circumferential groove 49, so that the central wheel 28 is firmly held in position and is axially nondisplaceable with respect to the intermediate shaft 29.

Figure 2:
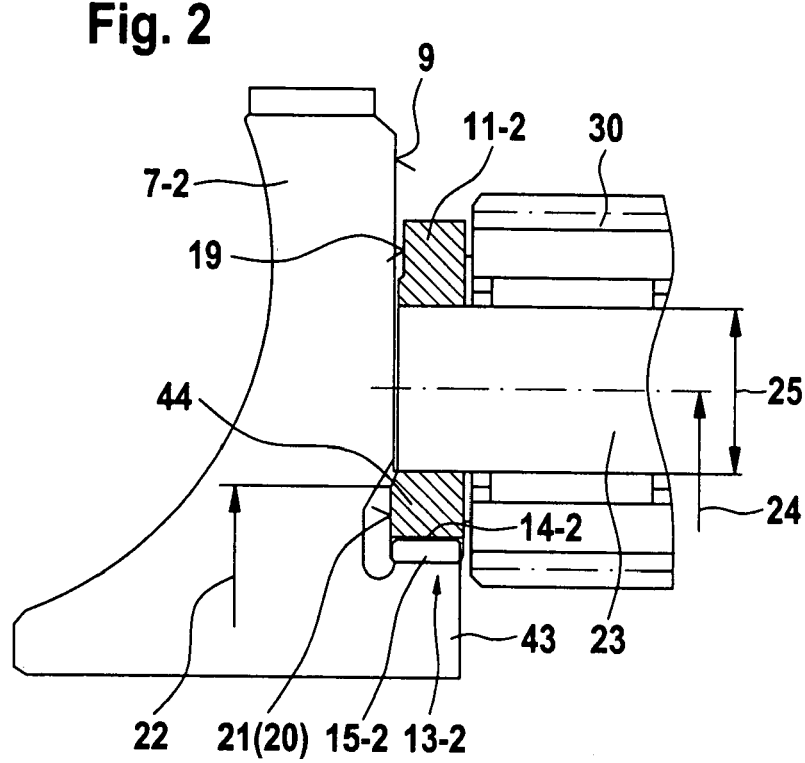
FIG. 2 shows, in an enlarged detail view of FIG. 1, a partial axial section showing the engagement of the planet carrier with the adjacent traction wheel.

In the embodiment of FIG. 2, a traction wheel 7-2, corresponding in its transmission function to the first drive-side traction wheel 7-1 of the toroidal drive 8 of FIG. 1, and a planet carrier 11-2, corresponding in its transmission function to the planet carrier 11-1 of the summing gear set 12 of FIG. 1, are connected to one another by means of a drive connection 13-2 corresponding in its transmission function to the direct rotationally fixed drive connection 13-1, but configured alternatively in structural terms. In the latter drive connection, the traction wheel 7-2 has, on its end face 9 facing the planet carrier 11-2, a hub extension 43 of reduced diameter, which is in axial overlap with a web part 44, disposed radially within the bearing bolts 23, of the planet carrier 11-2 and which is provided on its outer circumference with an inner axial toothing 14-2, with which a corresponding outer axial toothing 15-2 of the planet carrier 11-2 is engaged for rotational engagement therewith but is axially movable thereto. The traction wheel 7-2 and planet carrier 11-2 are supported relative to one another via their axial bearing surfaces 20, 21 (the axial bearing surface 20 is offset with respect to the image plane of FIG. 2 in the circumferential direction of the transmission axis 35—35) in the same way as the corresponding components in FIG. 1, so that the same reference numerals are used and reference may be made to the description of FIG. 1.

Figure 3:
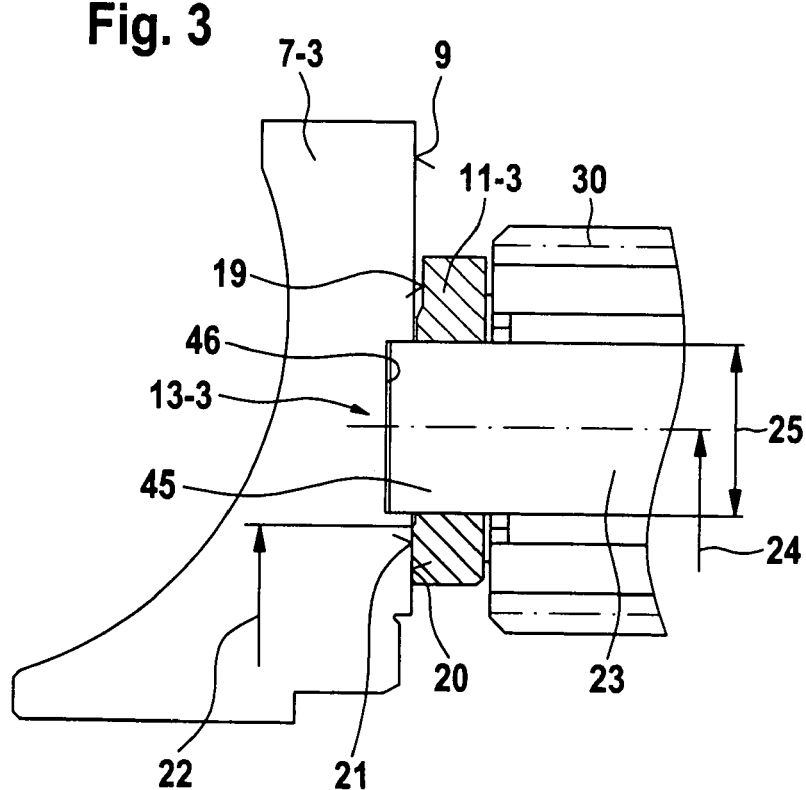
FIG. 3 shows, in an enlarged detail of FIG. 1, a partial axial section showing an alternative connection of the planet carrier and the adjacent traction wheel.

In the embodiment of FIG. 3, a traction wheel 7-3, corresponding in its transmission function to the first drive-side traction wheel 7-1 of the toroidal drive 8 of FIG. 1, and a planet carrier 11-3, corresponding in its transmission function to the planet carrier 11-1 of the summing gear set 12 of FIG. 1, are connected to one another by means of a drive connection 13-3 corresponding in its transmission function to the direct rotationally fixed drive connection 13-1 of FIG. 1, but configured alternatively in structural terms. In the latter drive connection, at least one bearing bolt 23 of a planet wheel 30 has at its end facing the traction wheel 7-3, an axial extension forming, an end-face coupling pin 45 which extends into a corresponding bore (blind bore) 46 on the adjacent end face 9 of the traction wheel 7-3 for the rotationally fixed connection of wheel and carrier. The traction wheel 7-3 and the planet carrier 11-3 are supported relative to one another via their axial bearing surfaces 20, 21 in the same way as the corresponding components in FIG. 1, so that the same reference numerals are used for this purpose and reference may be made to the respective description of FIG. 1.

What is claimed is:

1. A variable speed transmission arrangement comprising a central shaft (4) which extends through a first traction wheel (7-1) of an infinitely variable toroidal drive (8), said traction wheel (7-1) having a traction surface (6) on one end face (5), a summing gear set (12) with a planet carrier disposed adjacent said variable toroidal drive (8), said central shaft (4) being connected at its shaft end (10) adjacent the other end face (9) of the traction wheel (7-1) to the planet carrier (11-1) of said summing gear set (12) for rotation with the planet carrier (11-1), said traction wheel (7-1) and said planet carrier (11-1) being also joined for concurrent rotation, said traction wheel (7-1) having on its outer circumference at the largest diameter an axial toothing (14-1) and the planet carrier (11-1) having a corresponding inner axial toothing (15-1) in engagement with the toothing (14-1) on said traction wheel (7-1).

2. A variable speed transmission arrangement according to claim 1, wherein said central shaft (4) extends through a second traction wheel (17) of the toroidal drive (8), which the second traction wheel (17) is arranged, with respect to its toroidal traction surface (6), mirror-symmetrically to the first traction wheel (7-1) of the toroidal drive (8), and the second traction wheel (17) of the toroidal drive (8) is received axially displaceably in an annular cylinder (18) which is disposed at another end of said shaft (4), said second traction wheel (17) having at its outer circumference an axial toothing (14-1), and the annular cylinder (18) being provided with a corresponding circumferential inner axial toothing (15-1), by which the outer axial toothing (14-1) of the second central wheel (17) of the toroidal drive (8) is engaged for rotation with the annular cylinder (18) while being axially displaceable.

3. A variable speed transmission arrangement according to claim 1, wherein the planet carrier (11-1, 11-2, 11-3) is connected to the shaft end (10) of the central shaft (4) by a weld (27).

4. A variable speed transmission arrangement according to claim 1, wherein said planet carrier (11-1 or 11-2 or 11-3), includes bearing bolts (23) for mounting of planet wheels (30), and the planet carrier (11-1, 11-2, 11-3) and the first traction wheel (7-1, 7-2, 7-3) of the toroidal drive (8) have, on their adjacent end faces (19 and 9), corresponding axial bearing surfaces (21 and 20), an effective outside diameter (22) of which is at most equal to a reference value which corresponds to a pitch diameter (24) of the arrangements of the bearing bolts (23) on the planet carrier (11-1, 11-2, 11-3), reduced by the diameter (25) of the bearing bolts (23).

5. A variable speed transmission arrangement according to claim 2, wherein said central shaft (4) extends with radial clearance, through the second traction wheel (17) of the toroidal drive (8), which the second traction wheel (17) is arranged, with respect to its toroidal friction surface (6), mirror-symmetrically to the first traction wheel (7-1 or 7-2 or 7-3), that is connected directly to the planet carrier (11-1 or 11-2 or 11-3), of the toroidal drive (8), said second traction wheel (17) of the toroidal drive (8) being received in the annular cylinder (18) firmly connected to the central shaft (4), and a roller bearing (26), which allows relative movements in the direction of rotation and the axial direction, is disposed between the central shaft (4) and the second traction wheel (17) of the toroidal drive (8), said second traction wheel (17) being engaged by said cylinder (18) so as to permit axial movement but not rotational movement relative thereto.

6. A variable speed transmission arrangement according to claim 2, including and central shaft (4) which passes with radial clearance through said first traction wheel (7-1 or 7-2 or 7-3) of said infinitely variable toroidal drive (8), said first traction wheel having the toroidal traction surface (6) on the one end face (5), and being connected at the shaft end (10) adjacent the other end face (9) of the first traction wheel (7-1 or 7-2 or 7-3), of the toroidal drive (8), to the planet carrier (11-1, 11-2, 11-3) of the summing gear set (12) of the planet wheel for rotation with the planet carrier (11-1), a direct drive connection (13-1 or 13-2 or 13-3) being provided between the first traction wheel (7-1 or 7-2 or 7-3) of the toroidal drive (8) and the planet carrier (11-1 or 11-2 or 11-3), said central shaft (4) extending, with radial clearance, between the shaft ends (10 and 16), through an output-side traction wheel (28), which has a toroidal traction surface (6) on its end face facing the first traction wheel (7-1 or 7-2 or 7-3) of the toroidal drive (8) and which is connected for of rotation with a sun wheel (31) of the summing gear set (12) by means of an intermediate shaft (29) concentric to the central shaft (4) and passing with radial clearance through the first traction wheel (7-1, 7-2, 7-3) of the toroidal drive (8), said intermediate shaft being arranged axially displaceably in relation to one of the traction and sun wheels (28 and 31) mounted thereon for rotation therewith.

7. An arrangement according to claim 6, wherein the sun wheel (31) of the summing gear set (12) is axially displaceably supported on the intermediate shaft (29).

8. A variable speed transmission arrangement according to claim 7, wherein, for the rotationally fixed and axially displaceable arrangement of the intermediate shaft (29) in relation to the sun wheel (31), intermediate coupling members in the form of rolling balls (32) are provided, which are disposed in two opposite axial coupling grooves (33 and 34), of which one is associated with the intermediate shaft (29) and the other with the sun wheel (31).

9. A variable speed transmission arrangement according to claim 8, wherein the sun wheel (31) of the summing gear set (12) is axially supported, with respect to the planet carrier (11-1, 11-2, 11-3) and the first traction wheel (7-1 or 7-2 or 7-3) of the toroidal drive (8), by means of axial thrust bearings (36, 37).

10. An arrangement as claimed in claim 6, wherein the intermediate shaft (29) has on its outer circumference axial toothings (38 and 33) for rotationally fixed connection with the output traction wheel (28) and sun wheel (31).

11. A variable speed transmission arrangement according to claim 6, wherein axial securing means (39, 40) are arranged releasably, but captively, between the output traction wheel (28) and the intermediate shaft (29).

12. A variable speed transmission arrangement according to claim 6, wherein the output traction wheel (28) is shrink-fitted onto the intermediate shaft (29).

13. A variable speed transmission arrangement according to claim 1, wherein the shaft end (10), which is connected to the planet carrier (11-1 or 11-2 or 11-3), of the central shaft (4) is supported, with respect to a bearing bush (42) of a transmission housing by means of a radial bearing (41).

* * * * *